United States Patent
Nolsen et al.

(10) Patent No.: US 9,464,386 B2
(45) Date of Patent: Oct. 11, 2016

(54) FIXATION OF MINERAL OIL IN PAPER FOOD PACKAGING WITH LACCASE TO PREVENT MINERAL OIL MIGRATION INTO FOOD

(71) Applicant: Buckman Laboratories International, Inc., Memphis, TN (US)

(72) Inventors: Andre Nolsen, Eerbeek (NL); Robert Miller, Ghent (BE)

(73) Assignee: Buckman Laboratories International, Inc., Memphis, TN (US)

( * ) Notice: Subject to any disclaimer, the term of this patent is extended or adjusted under 35 U.S.C. 154(b) by 541 days.

(21) Appl. No.: 14/030,440

(22) Filed: Sep. 18, 2013

(65) Prior Publication Data

US 2014/0096487 A1    Apr. 10, 2014

Related U.S. Application Data

(60) Provisional application No. 61/712,039, filed on Oct. 10, 2012.

(51) Int. Cl.

| D21H 11/14 | (2006.01) |
| D21H 17/04 | (2006.01) |
| D21H 25/02 | (2006.01) |
| D21C 5/00  | (2006.01) |

(Continued)

(52) U.S. Cl.
CPC .............. *D21H 25/02* (2013.01); *D21C 5/005* (2013.01); *D21C 5/02* (2013.01); *D21H 11/14* (2013.01); *D21H 17/005* (2013.01); *D21H 17/04* (2013.01); *Y02W 30/648* (2015.05)

(58) Field of Classification Search
USPC ....... 152/158, 161, 162, 173, 179; 53/131.2, 53/452
See application file for complete search history.

(56) References Cited

U.S. PATENT DOCUMENTS

| 5,277,764 A | 1/1994 | Johansson et al. |
| 5,582,681 A * | 12/1996 | Back ............. D21C 5/005 162/111 |
| 5,620,565 A | 4/1997 | Lazorisak et al. |

(Continued)

FOREIGN PATENT DOCUMENTS

| DE | 19820947 A1 | 11/1998 |
| DE | 19726241 A1 | 12/1998 |

(Continued)

OTHER PUBLICATIONS

International Search Report and Written Opinion of the ISA, dated Dec. 4, 2013, issued in connection with corresponding International Application No. PCT/US2013/060365 (11 pages).

(Continued)

*Primary Examiner* — Dennis Cordray
(74) *Attorney, Agent, or Firm* — Kilyk & Bowersox, P.L.L.C.

(57) ABSTRACT

A method is provided for preventing, minimizing, and/or eliminating the migration of mineral oils from paper food packaging into packaged food. The method can include adding a copper-containing oxidase enzyme, such as a laccase enzyme, to a paper pulp from which the paper food packaging is to be formed. The migration of mineral oils originating from residual inks in recycled old corrugated containers and old newsprint, is particularly suppressed, including the migration of $C_{10}$-$C_{25}$ fractions of aromatic mineral oil hydrocarbons and of saturated mineral oil hydrocarbons.

26 Claims, 3 Drawing Sheets

|  | A | B | C |
|---|---|---|---|
|  | Control | Fixation | Fixation |
| Products | - | BLX13290 | LS*+ BLX13290 |
| Dosage | 0 | 1 kg/ton | 200 g/t + 1 kg/ton |
| Contact time | 35 min | 35 min | 35 min |
| Temperature Start - End | 44-50°C | 44-50°C | 44-50°C |
| pH | 7 | 7 | 7 |

(51) Int. Cl.
  *D21C 5/02*   (2006.01)
  *D21H 17/00*  (2006.01)

(56) References Cited

U.S. PATENT DOCUMENTS

| | | | |
|---|---|---|---|
| 6,137,099 A | 10/2000 | Hamblin | |
| 6,537,680 B1 | 3/2003 | Norlander et al. | |
| 6,610,172 B1 * | 8/2003 | Lund | D21H 21/20 |
| | | | 162/190 |
| 6,994,898 B2 | 2/2006 | Olsson et al. | |
| 7,244,509 B1 | 7/2007 | Seydel | |
| 9,034,444 B2 * | 5/2015 | Seyffer | B32B 29/06 |
| | | | 428/34.2 |
| 2015/0136343 A1 * | 5/2015 | Tausche | D21H 27/002 |
| | | | 162/5 |

FOREIGN PATENT DOCUMENTS

| | | |
|---|---|---|
| EP | 2199046 A1 | 6/2010 |
| WO | 97/38164 A1 | 10/1997 |
| WO | 2006/032724 A2 | 3/2006 |
| WO | 2008/076322 A2 | 6/2008 |
| WO | 2010/075402 A1 | 7/2010 |

OTHER PUBLICATIONS

Widsten et al., "Laccase applications in the forest products industry: A review," Enzyme and Microbial Technology, vol. 42, (2008) pp. 293-307.

Wikipedia, "Laccase," http://en.wikipedia.org/wiki/Laccase, retrieved Oct. 2, 2012, 3 pages.

* cited by examiner

|  | A | B | C |
|---|---|---|---|
| Products | Control | Fixation BLX13290 | Fixation LS*+ BLX13290 |
| Dosage | 0 | 1 kg/ton | 200 g/t + 1 kg/ton |
| Contact time | 35 min | 35 min | 35 min |
| Temperature Start - End | 44-50°C | 44-50°C | 44-50°C |
| pH | 7 | 7 | 7 |

FIG. 1

| Result: | MOSH | | | MOAH | | |
|---|---|---|---|---|---|---|
| | $C_{10} - \leq C_{16}$ | $C_{16} - \leq C_{25}$ | $C_{25} - \leq C_{35}$ | $\leq C_{25}$ | $C_{25} - \leq C_{35}$ | |
| Sample A: | <0.1 | 0.43 | 0.25 | 0.13 | <0.1 | mg/dm² |
| Sample B: | <0.1 | 0.32 | 017 | 0.12 | <0.1 | mg/dm² |
| Sample C: | <0.1 | 0.15 | 0.18 | <0.1 | <0.1 | mg/dm² |

FIG. 2

FIXATION OF MINERAL OIL IN PAPER FOOD PACKAGING WITH LACCASE TO PREVENT MINERAL OIL MIGRATION INTO FOOD

This application claims the benefit under 35 U.S.C. §119 (e) of prior U.S. Provisional Patent Application No. 61/712,039, filed Oct. 10, 2012, which is incorporated in its entirety by reference herein.

The present invention relates generally to methods of reducing the migration of mineral oils from paper food packaging into food.

BACKGROUND

More and more manufacturers of food packaging are concerned about the migration of mineral oils from paper packaging made of recycled papers, into food. Residual mineral oils which originate from the inks in recycled paper products can contaminate food. Recyclable products that contain such inks include those made out of old corrugated containers (OCC) and old newsprint (ONP). It is very difficult and costly for packaging manufacturers to try to eliminate these problematic inks from recycled paper products, particularly old newspapers, that contain such inks. Inks that include mineral oils containing carbon atom chains of from $C_{10}$ to $C_{25}$ present the greatest migration problems in such paper food packaging.

There is a need to fix mineral oils in paper food packaging products so that the mineral oils do not migrate into food that is packaged by such products. Mineral oil saturated hydrocarbons (MOSH) and mineral oil aromatic hydrocarbons (MOAH) present in paper packaging can migrate into food that is packaged in such paper packaging. MOSH and MOAH can possibly be carcinogenic when accumulated in a human body. There are guidelines that give limits to the content of mineral oil that is acceptable in food. The current levels are 0.6 mg/kg MOSH and 0.15 mg/kg MOAH. While it is desirable to provide paper food packaging products that meet these guideline levels, it is even more desirable to completely eliminate migration of these mineral oils.

SUMMARY OF THE PRESENT INVENTION

A feature of the present invention is to prevent or minimize mineral oil migration from the packaging.

A further feature of the present invention is to provide a packaging that prevents contamination of material, such as food or food-grade material, from mineral oil in the packaging.

An additional feature of the present invention is to provide a method that traps or otherwise binds mineral oil and/or derivatives thereof in paper, paperboard, or paper products, during the paper making stage.

A further feature is to provide packaging that permits food or foodstuff contained by that packaging to have 0.6 mg/kg MOSH or less, and/or to have 0.15 mg/kg MOAH or less in the food or foodstuff.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages and in accordance with the purposes of the present invention, as embodied and broadly described herein, the present invention relates to a method where migration of mineral oils (or certain types of mineral oils) from paper food packaging is reduced, minimized, suppressed, or eliminated. Mineral oil can be trapped in a paper food packaging by fixation and/or hydrophobic interactions, and thereby be prevented from migrating into food that is in contact with or contained by the packaging. The fixation and/or hydrophobic interactions can be caused by polymerization of lignin in the paper pulp used to form the paper food packaging. To effect or enhance polymerization of lignin in the paper pulp, a copper-containing oxidase enzyme can be added to the pulp to catalyze polymerization of the available soluble lignin in the paper pulp.

The paper pulp can include or be formed of recycled paper such as old newsprint, old corrugated containers, paperboard, cardboard, combinations thereof, and the like. The enzyme can also be used to polymerize soluble lignin found elsewhere in the water circuits of a paper mill. The polymerized lignin can be formed on, and/or deposited on, the fibers of the pulp, thereby increasing the tendency of the mineral oil, particularly the $C_{10}$-$C_{25}$ hydrocarbon fraction of the mineral oil, to bind to the fibers via hydrophobic interactions or become trapped in the thus-formed lignin polymer matrix. Aromatic mineral oil compounds can be captured in the oxidative polymerization cascade or matrix. Moreover, the barrier properties of the enzymatically polymerized substances, at the board surface of the paper food packaging product, can physically prevent mineral oil migration, for example, migration of $C_{10}$ to $C_{25}$ hydrocarbons.

The copper-containing oxidase enzyme can be added in a catalytically effective amount to catalyze the polymerization of soluble lignin within the pulp. The copper-containing oxidase enzyme can be a laccase enzyme. The enzyme can be formulated in a formulation that can comprise, for example, an aqueous vehicle or solution. If in a formulation, the enzyme can be present in the formulation in an amount of from about 1% by weight to about 50% by weight, based on the total weight of the enzyme formulation. For an enzyme formulation containing a laccase enzyme, the formulation can be added to a paper pulp in a catalytically effective amount to cause polymerization of lignin. The enzyme formulation can be added in an amount of from about 10 grams per ton to about 500 grams per ton, based on the total weight of the paper pulp, and for a paper pulp having a solids content of from about 2% by weight to about 10% by weight. For other solids contents, the amount of enzyme or enzyme formulation can be adjusted accordingly. If an enzyme formulation is used, the amount can be adjusted based on the concentration of enzyme in the enzyme formulation.

The paper pulp can include residual mineral oils, for example, $C_{10}$-$C_{25}$ mineral oils from inks in old recycled newsprint. The mineral oils can be considered contaminants. The paper pulp can be made of old newsprint (ONP), old corrugated containers (OCC), virgin paper pulp, combinations thereof, and the like. The present invention enables waste materials such as ONP and OCC to be safely recycled and used in paper food packaging products.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

BRIEF DESCRIPTION OF THE DRAWINGS

FIG. 1 is a table showing the treatment time, temperature, pH, and dosage of laccase enzyme incorporated into a paper pulp used as a control (Sample A) and into two paper pulps according to the present invention (Samples B and C).

FIG. 2 is a table showing the amount of paraffinic hydrocarbon, MOSH, and MOAH compounds that migrated from paper food packaging products made from a control paper pulp (Sample A) and made from two paper pulps according to the present invention (Samples B and C).

DETAILED DESCRIPTION OF THE PRESENT INVENTION

Figure 3:
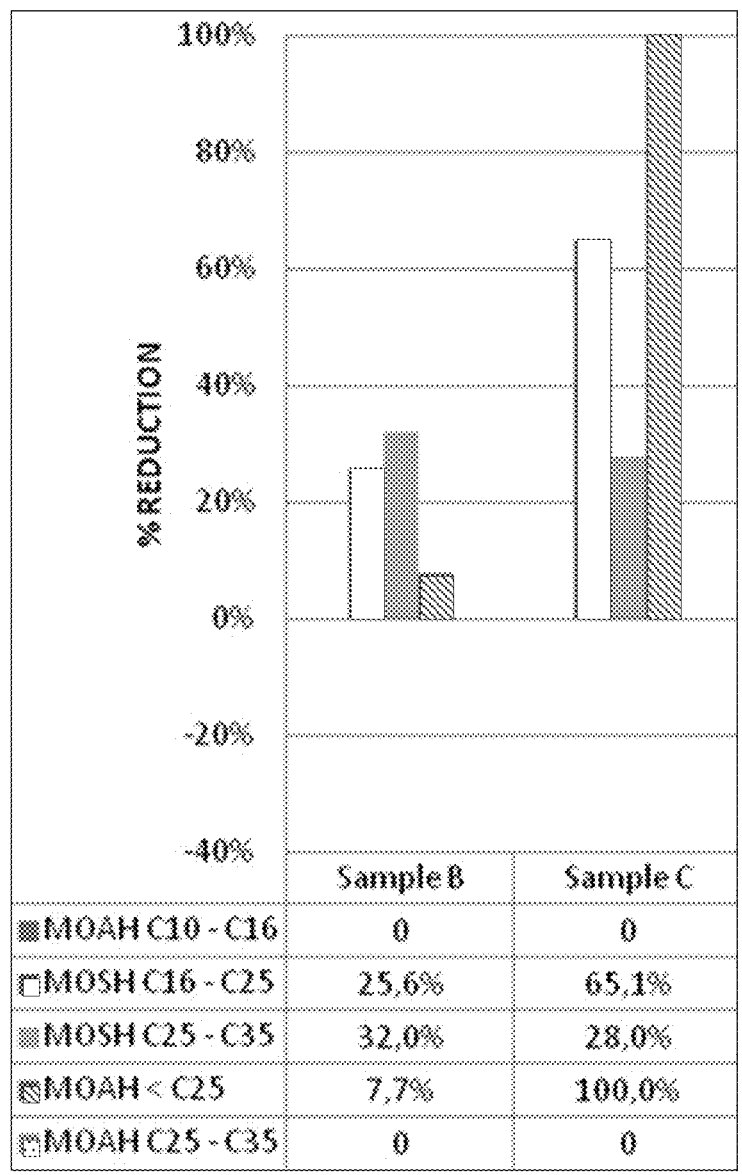
FIG. 3 is a bar graph showing the percent reduction in the migration of MOSH and MOAH compounds from paper food packaging products made from a control paper pulp (Sample A) compared to those made from paper pulps according to the present invention (Samples B and C).

The present invention provides a method for minimizing, preventing, or eliminating migration of mineral oils from paper food packaging into food packaged by the packaging. Paper food packaging can be made from recycled materials without a need for concern about migration of mineral oils from the paper food packaging into food. Residual mineral oils which originate from inks in recycled paper products can be fixed in the paper food packaging and thus prevented from migrating. Recyclable materials that contain such inks, including old corrugated containers (OCC) and old newsprint (ONP), can be used to manufacture paper food packaging and can provide an environmentally friendly alternative to using virgin paper pulp. For purposes of the present invention, the any paper, paperboard, or containers made therefrom, can benefit from the present invention, whether food containing or not. Further, it is to be understood that while the phrase "food packaged" is used throughout, the "food" can be considered food, food stuff, or food-grade material used to make food.

It has been found that larger hydrocarbon molecules, e.g., those containing over 26 carbon atoms, do not typically migrate and thus do not pose as much of a concern as lower fractions. Smaller hydrocarbon molecules, e.g., those containing less than 10 hydrocarbons, typically evaporate and thus also do not pose much of a concern. Hydrocarbons having from about 10 to about 25 hydrocarbons, however, do migrate and do not tend to evaporate, particularly aromatic hydrocarbons and saturated hydrocarbons having from 16 to 25 carbon atoms. According to the present invention, mineral oil, including these $C_{16}$-$C_{25}$ fraction hydrocarbons, can be trapped in a paper food packaging product by fixation and/or hydrophobic interactions. The fixation and/or hydrophobic interactions can be caused by polymerization of lignin in the paper pulp. To effect polymerization of lignin in the paper pulp, at least one copper-containing oxidase enzyme can be added to the pulp to catalyze polymerization of the available lignin.

According to the present invention, a method of minimizing migration of mineral oils from paper food packaging, into food, is provided. The method can include forming a paper pulp comprising lignin and mineral oils. A copper-containing oxidase enzyme can be added to the paper pulp in an amount sufficient to cause polymerization of at least some of the lignin in the paper pulp, thus forming a treated pulp. A paper food packaging can be formed from the treated pulp. The paper food packaging can exhibit less migration of the mineral oils into food than the amount of migration that would be exhibited by a paper food packaging formed from substantially the same paper pulp but without the addition of the copper-containing oxidase enzyme. In other words, according to the present invention, migration of mineral oils is reduced by adding the copper-containing oxidase enzyme to the paper pulp that forms the paper food packaging.

The amount of reduction of mineral oil migration (based on the total weight of <$C_{25}$ mineral oil present) can be dependent on the weight of the mineral oil fraction, but can be 25% or more, 50% or more, 75% or more, 90% or more, 95% or more, or about 100%, for aromatic hydrocarbon mineral oils (MOAH) having less than 25 carbon atoms, compared to a control with no enzyme present. The reduction of mineral oil migration (based on the total weight of $C_{25}$ to $C_{35}$ mineral oil present) for saturated hydrocarbon mineral oils (MOSH), having from 25 carbon atoms to 35 carbon atoms, can be 10% or more, 15% or more, 20% or more, 25% or more, 30% or more, 35% or more, or 40% or more, compared to a control with no enzyme present. The reduction of mineral oil migration (based on the total weight of $C_{16}$ to $C_{25}$ mineral oil present) for saturated hydrocarbon mineral oils (MOSH), having from 16 carbon atoms to 25 carbon atoms, can be 30% or more, 40% or more, 50% or more, 60% or more, 65% or more, or 70% or more, compared to a control with no enzyme present.

With the present invention, paper, paperboard, other paper products, including packaging (or parts thereof) can permit food or foodstuff contained by that paper, paperboard, other paper products, such as packaging to have 0.6 mg/kg MOSH or less (e.g., 0 to 0.6 mg/kg, 0.0001 to 0.5 mg/kg, 0.001 to 0.4 mg/kg, 0.01 to 0.4 mg/kg, 0.1 to 0.25 mg/kg MOSH, and the like), and/or to have 0.15 mg/kg MOAH or less (0 to 0.15 mg/kg, 0.0001 to 0.1 mg/kg, 0.001 to 0.05 mg/kg, and the like) in the food or foodstuff. The "mg/kg" is a reference to mg of MOSH or MOAH per kg of food or foodstuff. Instead of food or foodstuff, this migration amounts can apply in general to the paper products made according to the present invention.

With the present invention, the MOSH and MOAH can have the following migration amounts (in mg) per $dm^2$ of paper or paperboard:

| MOSH | | | MOAH | | |
|---|---|---|---|---|---|
| $C_{10}$-≤$C_{16}$ | $C_{16}$-≤$C_{25}$ | $C_{25}$-≤$C_{35}$ | ≤$C_{25}$ | $C_{25}$-≤$C_{35}$ | |
| <0.1, or <0.05, or <0.025, or <0.01, or 0.0001 to 0.09 | <0.5, or <0.4, or <0.3, or <0.2, or <0.1, or 0.0001 to 0.49 | <0.5, or <0.4, or <0.3, or <0.2, or <0.1, or 0.0001 to 0.49 | <0.5, or <0.4, or <0.3, or <0.2, or <0.1, or 0.0001 to 0.49 | <0.5, or <0.4, or <0.3, or <0.2, or <0.1, or 0.0001 to 0.49 | mg/$dm^2$ |

The copper-containing oxidase enzyme can be or include at least one laccase enzyme. The enzyme can be formulated in an aqueous vehicle or solution. If in a formulation, the enzyme can be present in the formulation in an amount of from about 0.01% by weight to about 50% by weight (or more), or from about 0.1% by weight to about 30% by weight, or from about 0.5% by weight to about 10% by weight, or from about 1% by weight to 5% by weight, based on the total weight of the enzyme formulation. For an enzyme formulation containing a laccase enzyme, such as BLX-13290 from Buckman Laboratories, Inc., of Memphis, Tenn., the formulation can be added to a paper pulp in an effective amount to cause polymerization of lignin. The enzyme formulation can be added in an amount of from about 10 grams per ton to about 1000 grams per ton or more, or from about 50 grams per ton to about 500 grams per ton, or from about 100 grams per ton to about 300 grams per ton, or from about 150 grams per ton to about 250 grams per ton, based on the total weight of the paper pulp, where ton is dry metric ton. The paper pulp can have any solids content, such as a solids content of from about 0.1% by weight to about 10% by weight or more, or from 0.5% by weight to about 5% by weight, or from about 2% by weight to about 10% by weight, based on weight of the pulp or fiber slurry.

The paper pulp can include $C_{10}$-$C_{25}$ mineral oils, for example, from inks in old newsprint. The mineral oils can be considered contaminants. The paper pulp can be made (at least a portion thereof) of old newsprint (ONP), old corrugated containers (OCC), virgin paper pulp, combinations thereof, or the like. The paper pulp can comprise a combination of old newsprint (ONP) and old corrugated containers (OCC). The paper pulp can be made of from about 25% by weight to about 75% by weight ONP and from about 25% by weight to about 75% by weight OCC, based on the total fiber weight of the pulp. The paper pulp can be diluted with water to have a consistency of from about 2% by weight solids to about 20% by weight solids, based on the total weight of the paper pulp, before adding the copper-containing oxidase enzyme. The paper pulp can be diluted with water to form a consistency of from about 3% by weight solids to about 7% by weight solids, of from about 4% by weight solids to about 6% by weight solids, or to about 5% by weight solids, based on the total weight of the paper pulp, before adding the copper-containing oxidase enzyme.

The copper-containing oxidase enzyme can be mixed with the paper pulp, and the enzyme and pulp can be kept in contact with one another, e.g., mixed, for at least 30 minutes before forming a paper food packaging with the treated pulp. The copper-containing oxidase enzyme can be mixed with the paper pulp to form a mixture, and the temperature of the mixture can be maintained at a temperature of equal to or greater than 30° C., 35° C., 40° C., or higher. The mixture can be maintained at such a temperature for at least 10 minutes, for at least 20 minutes, for at least 30 minutes, for at least 40 minutes, or longer, before forming the paper food packaging with the treated pulp.

Lignosulphonate can be added to the paper pulp, before, during, and/or after adding the copper-containing oxidase enzyme. If sufficient soluble lignin is available in the pulp, no lignosulphonate is added. A test sheet, such as a handsheet, can be constructed from an enzyme-enhanced batch of paper pulp and if unacceptable levels of lignin are detected, or if unacceptable levels of mineral oil migration are exhibited, lignosulphonate can be added to the pulp and samples can be tested until adequate polymerization of lignin is achieved.

Soluble lignin can be added to the paper pulp to increase the amount of available lignin. Lignosulphonate can be used, for example, in any amount to increase the amount of polymerization of lignin and fixation of mineral oils. Lignosulphonate can be added in amounts of from about 50 grams per ton to about 1000 grams per ton, from about 75 grams per ton to about 500 grams per ton, from about 100 grams per ton to about 300 grams per ton, from about 150 grams per ton to about 250 grams per ton, or in an amount of about 200 grams per ton.

Forming the paper food packaging can involve any conventional paper-forming process as is known in the art, including, for example, the processes, systems, and products described in U.S. Pat. Nos. 7,244,509; 6,994,898; 6,537,680; and 6,137,099, which are incorporated herein in their entireties by reference.

The present invention can further include packaging food with the paper food packaging. The food can be stored in the paper food packaging for at least 5 days, for at least 20 days, or for at least 60 days. The packaging of the food can occur on a first date, and the method can further involve labeling the paper food packaging with a sell-by date, a use-by date, or an expiration date, that is at least five days after the first date, for example, at least 10 days after or at least 20 days after the first date. The paper food packaging of the present invention can prevent unacceptable migration of mineral oils until at least the date labeled on the packaging.

The present invention also provides a paper food packaging that is made of a paper pulp comprising lignin and which contains residual mineral oils from recycled materials. A copper-containing oxidase enzyme can be added to the paper pulp in an amount sufficient to cause polymerization of at least some of the lignin in the paper pulp, and the paper food packaging can be formed from the treated pulp. The paper food packaging can exhibit less migration of the mineral oils into food than would be exhibited by a paper food packaging formed from substantially the same paper pulp but without any addition of any copper-containing oxidase enzyme.

The present invention also provides, in combination, food packaged in the paper food packaging described herein. The paper food packaging can have a sell-by date, a use-by date, or an expiration date, that is at least 5 days, at least 20 days, or at least 60 days after the date when the food was packaged in the paper food packaging.

The present invention can be useful to effect mineral oil bonding in folding board, container board, paperboard, and other paper products, when used as food packaging. The present invention can be useful to effect mineral oil bonding in paper products of all paper grades when food is expected to contact such products.

To test mineral oil migration into food, from paper food packaging, a synthetic food simulant can be used from which adsorbed mineral oil can be extracted. As an example, the polymeric materials TENAX® and TENAX® TA can be used as food simulants. TENAX® is the registered trademark of, and available from, Buchem B.V., of Apeldoorn, The Netherlands. TENAX® is poly(2,6-diphenyl-p-phenylene oxide) (PPPO), a porous polymer resin based on oxidative polymerization of 2,6-diphenylphenol. The porous nature of the polymer enables it to efficiently trap volatiles. As described in the Examples below, TENAX® can be used for testing paper food packaging, for example, as a substitute test medium for fatty food. TENAX® exhibits good thermal stability and therefore can be used for migration testing at elevated temperatures. Other advantages of using this polymer are its high sorption capacity and its ease of handling.

The present invention includes the following aspects/embodiments/features in any order and/or in any combination:

1. The present invention relates to a method for the fixation of mineral oils in paper food packaging to at least minimize migration of the mineral oils, the method comprising:
    forming a paper pulp comprising lignin and mineral oils;

adding to the paper pulp at least one copper-containing oxidase enzyme in an amount sufficient to cause polymerization of at least some of the lignin in the paper pulp, to form a treated pulp; and forming a paper food packaging from the treated pulp, wherein the paper food packaging exhibits less migration of the mineral oils into food than would be exhibited by a paper food packaging formed from substantially the same paper pulp but without the addition of the copper-containing oxidase enzyme.

2. The method of any preceding or following embodiment/feature/aspect, further comprising adding lignosulphonate to the paper pulp.

3. The method of any preceding or following embodiment/feature/aspect, further comprising adding lignosulphonate to the paper pulp before adding the copper-containing oxidase enzyme.

4. The method of any preceding or following embodiment/feature/aspect, wherein the at least one copper-containing oxidase enzyme comprises a laccase enzyme.

5. The method of any preceding or following embodiment/feature/aspect, wherein the paper pulp comprises $C_{10}$-$C_{25}$ mineral oils.

6. The method of any preceding or following embodiment/feature/aspect, wherein the paper pulp comprises old newsprint (ONP), old corrugated containers (OCC), or both.

7. The method of any preceding or following embodiment/feature/aspect, wherein the paper pulp comprises from about 25% by weight to about 75% by weight ONP and from about 25% by weight to about 75% by weight OCC, based on the total fiber weight of the pulp.

8. The method of any preceding or following embodiment/feature/aspect, wherein the paper pulp is diluted with water to form a consistency of from about 0.2% by weight solids to about 20% by weight solids, based on the total weight of the paper pulp, before adding the copper-containing oxidase enzyme.

9. The method of any preceding or following embodiment/feature/aspect, wherein the paper pulp is diluted with water to form a consistency of from about 0.5% by weight solids to about 7% by weight solids, based on the total weight of the paper pulp, before adding the copper-containing oxidase enzyme.

10. The method of any preceding or following embodiment/feature/aspect, wherein the adding comprises mixing together the laccase enzyme and the paper pulp for at least 30 minutes before forming the treated pulp into the paper food packaging.

11. The method of any preceding or following embodiment/feature/aspect, wherein the adding comprises mixing the copper-containing oxidase enzyme with the paper pulp to form a mixture, and maintaining a temperature of the mixture at a temperature of equal to or greater than 40° C., for at least 30 minutes, before forming the paper food packaging with the treated pulp.

12. The method of any preceding or following embodiment/feature/aspect, further comprising packaging food with the paper food packaging.

13. The method of any preceding or following embodiment/feature/aspect, further comprising storing the food in the paper food packaging for at least 10 days.

14. The method of any preceding or following embodiment/feature/aspect, wherein the packaging of the food occurs on a first date, and the method further comprises labeling the paper food packaging with a date that is at least ten days after the first date.

15. A paper food packaging made by a method comprising:
  forming a paper pulp comprising lignin and mineral oils;
  adding to the paper pulp at least one copper-containing oxidase enzyme in an amount sufficient to cause polymerization of at least some of the lignin in the paper pulp, to form a treated pulp; and
  forming a paper food packaging from the treated pulp, wherein the paper food packaging exhibits less migration of the mineral oils into food than would be exhibited by a paper food packaging formed from substantially the same paper pulp but without the addition of the copper-containing oxidase enzyme.

16. The paper food packaging of any preceding or following embodiment/feature/aspect, wherein the paper pulp comprises $C_{10}$-$C_{25}$ mineral oils.

17. The paper food packaging of any preceding or following embodiment/feature/aspect, wherein the paper pulp comprises one or more of old newsprint (ONP) and old corrugated containers (OCC).

18. The paper food packaging of any preceding or following embodiment/feature/aspect, wherein the paper pulp comprises from about 25% by weight to about 75% by weight ONP and from about 25% by weight to about 75% by weight OCC, based on the total fiber weight of the pulp.

19. The paper food packaging of any preceding or following embodiment/feature/aspect, further comprising a food packaged in the paper food packaging.

20. The paper food packaging of any preceding or following embodiment/feature/aspect, further comprising a date labeled on the packaging, wherein the date is at least ten days after the date when the food was packaged in the paper food packaging.

21. The method of any preceding or following embodiment/feature/aspect, wherein said paper food packaging permits food or foodstuff contained by said paper food packaging to have 0.6 mg/kg MOSH or less, and/or to have 0.15 mg/kg MOAH or less in the food or foodstuff.

22. The method of any preceding or following embodiment/feature/aspect, wherein said paper food packaging permits food or foodstuff contained by said paper food packaging to have from 0.0001 mg/kg to 0.25 mg/kg MOSH, and/or to have from 0.0001 mg/kg to 0.01 mg/kg MOAH in the food or foodstuff.

23. A paper product comprising paper fibers and mineral oil, wherein said paper product has a MOSH migration of 0.5 mg/dm$^3$ or less and/or a MOAH migration of 0.2 mg/dm$^3$ or less.

24. A paper product comprising paper fibers and mineral oil, wherein said paper product has a MOSH migration of 0.2 mg/dm$^3$ or less and/or a MOAH migration of 0.1 mg/dm$^3$ or less.

25. A paper product comprising paper fibers and mineral oil, wherein said paper product has a MOSH migration of 0.5 mg/dm$^3$ or less for $C_{16}$ to $C_{25}$.

26. A paper product comprising paper fibers and mineral oil, wherein said paper product has a MOSH migration of 0.2 mg/dm$^3$ or less for $C_{16}$ to $C_{25}$.

27. A paper product comprising paper fibers and mineral oil, wherein said paper product has a MOSH migration of 0.001 to 0.15 mg/dm$^3$ for $C_{16}$ to $C_{25}$.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention.

EXAMPLES 200 g of bone dry fiber containing a 60%:40% ratio by weight (OCC:ONP) mix was re-pulped with 4 liters of hot tap water to obtain a 5% consistency. Laccase enzyme was added in the form of product no. BLX13290 available from Buckman Laboratories, Memphis, Tenn. The laccase enzyme was added at the start of re-pulping. The temperature before and after 35 minutes of re-pulping time, was recorded. The above procedure was repeated for a control and for comparative products. The various ingredients and process conditions used to make handsheets from each pulp are shown in the graph of FIG. 1. The use of BRD2358 required prior adjustment of the pH to 9.5 using dilute sodium hydroxide. An amount of 60 g of treated pulp was used to make a handsheet having a sheet weight of approximately 150 grams per square meter (gsm). Two higher sheet weight, blank handsheets were also made which had sheet weights of approximately 250 gsm. Four to five handsheets were made from each pulp, including the control. The oven dried handsheets were then analyzed for mineral oil contents using chromatography methods. The products shown in each of samples B-F are available from Buckman Laboratories, Memphis, Tenn. The term "LS" appearing in FIG. 1 for Sample C refers to lignosulphonate. For each sample pulp, the amount of free chlorine in the tap water used for dilution was 0.03 ppm.

Mineral oil migration testing was performed according to the standard test method DIN EN 14338. One side of each handsheet was contacted with TENAX® TA, 60-80 mesh, for example, as available from Buchem B.V., of Apeldoorn, The Netherlands. TENAX® TA is a modified polyphenylene oxide. Contact was maintained for 10 days at 40° C. The volatile components adsorbed onto the TENAX® TA were extracted with hexane. The determination of the paraffinic, naphthenic (MOSH), and the aromatic mineral oil hydrocarbons (MOAH) was performed by means of a combined procedure including high performance liquid chromatography, gas chromatography, and flame ionization detection (HPLC-GC-FID). Other detection methods can be used. The quantification of the MOSH as well as of the MOAH fraction was performed, each time, using internal standards. In both fractions, the chromatographically non-resolved hump, including signals on top, were integrated. Hydrocarbon compounds not counting as mineral oil were deducted from the quantification.

As can be seen by the results shown in FIG. 3, the reduction of MOAH was very effective, particularly when considering that the total amount of MOAH found in the control was very close to the detection limit. The reduction of the MOSH was even more surprising. The treatment with laccase resulted in a reduction of 65.1% in the $C_{16}$-$C_{25}$ fraction. The $C_{26}$-$C_{35}$ fraction was reduced by 28%.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for the fixation of mineral oils in paper food packaging to at least minimize migration of the mineral oils, the method comprising:
    forming a paper pulp comprising lignin and mineral oils;
    adding to the paper pulp at least one copper-containing oxidase enzyme in an amount sufficient to cause polymerization of at least some of the lignin in the paper pulp, to form a treated pulp; and
    forming a paper food packaging from the treated pulp, wherein the paper food packaging exhibits less migration of the mineral oils into food than would be exhibited by a paper food packaging formed from substantially the same paper pulp but without the addition of the copper-containing oxidase enzyme.

2. The method of claim 1, further comprising adding lignosulphonate to the paper pulp.

3. The method of claim 1, further comprising adding lignosulphonate to the paper pulp before adding the copper-containing oxidase enzyme.

4. The method of claim 1, wherein the at least one copper-containing oxidase enzyme comprises a laccase enzyme.

5. The method of claim 1, wherein the paper pulp comprises $C_{10}$-$C_{25}$ mineral oils.

6. The method of claim 1, wherein the paper pulp comprises old newsprint (ONP), old corrugated containers (OCC), or both.

7. The method of claim 6, wherein the paper pulp comprises from about 25% by weight to about 75% by weight ONP and from about 25% by weight to about 75% by weight OCC, based on the total fiber weight of the pulp.

8. The method of claim 1, wherein the paper pulp is diluted with water to form a consistency of from about 0.2% by weight solids to about 20% by weight solids, based on the total weight of the paper pulp, before adding the copper-containing oxidase enzyme.

9. The method of claim 1, wherein the paper pulp is diluted with water to form a consistency of from about 0.5% by weight solids to about 7% by weight solids, based on the total weight of the paper pulp, before adding the copper-containing oxidase enzyme.

10. The method of claim 1, wherein the adding comprises mixing together the laccase enzyme and the paper pulp for at least 30 minutes before forming the treated pulp into the paper food packaging.

11. The method of claim 1, wherein the adding comprises mixing the copper-containing oxidase enzyme with the paper pulp to form a mixture, and maintaining a temperature of the mixture at a temperature of equal to or greater than 40° C., for at least 30 minutes, before forming the paper food packaging with the treated pulp.

12. A method of packaging food comprising:
    forming a paper pulp comprising lignin and mineral oils;
    adding to the paper pulp at least one copper-containing oxidase enzyme in an amount sufficient to cause polymerization of at least some of the lignin in the paper pulp, to form a treated pulp;

forming a paper food packaging from the treated pulp, wherein the paper food packaging exhibits less migration of the mineral oils into food than would be exhibited by a paper food packaging formed from substantially the same paper pulp but without the addition of the copper-containing oxidase enzyme; and packaging food with the paper food packaging.

13. The method of claim 12, further comprising storing the food in the paper food packaging for at least 10 days.

14. The method of claim 12, wherein the packaging of the food occurs on a first date, and the method further comprises labeling the paper food packaging with a date that is at least ten days after the first date.

15. A paper food packaging made by a method comprising:

forming a paper pulp comprising lignin and mineral oils;

adding to the paper pulp at least one copper-containing oxidase enzyme in an amount sufficient to cause polymerization of at least some of the lignin in the paper pulp, to form a treated pulp; and forming a paper food packaging from the treated pulp, wherein the paper food packaging exhibits less migration of the mineral oils into food than would be exhibited by a paper food packaging formed from substantially the same paper pulp but without the addition of the copper-containing oxidase enzyme.

16. The paper food packaging of claim 15, wherein the paper pulp comprises $C_{10}$-$C_{25}$ mineral oils.

17. The paper food packaging of claim 15, wherein the paper pulp comprises one or more of old newsprint (ONP) and old corrugated containers (OCC).

18. The paper food packaging of claim 17, wherein the paper pulp comprises from about 25% by weight to about 75% by weight ONP and from about 25% by weight to about 75% by weight OCC, based on the total fiber weight of the pulp.

19. A packaged food comprising food packaged in a paper food packaging made by the method comprising:

forming a paper pulp comprising lignin and mineral oils;

adding to the paper pulp at least one copper-containing oxidase enzyme in an amount sufficient to cause polymerization of at least some of the lignin in the paper pulp, to form a treated pulp; and forming a paper food packaging from the treated pulp, wherein the paper food packaging exhibits less migration of the mineral oils into food than would be exhibited by a paper food packaging formed from substantially the same paper pulp but without the addition of the copper-containing oxidase enzyme.

20. The packaged food of claim 19, wherein said paper food packaging permits food or foodstuff contained by said paper food packaging to have 0.6 mg/kg MOSH or less, and/or to have 0.15 mg/kg MOAH or less in the food or foodstuff.

21. The packaged food of claim 19, wherein said paper food packaging permits food or foodstuff contained by said paper food packaging to have from 0.0001 mg/kg to 0.25 mg/kg MOSH, and/or to have from 0.0001 mg/kg to 0.01 mg/kg MOAH in the food or foodstuff.

22. A paper product comprising paper fibers and mineral oil, wherein said paper product has a MOSH migration of 0.5 mg/dm$^2$ or less and/or a MOAH migration of 0.2 mg/dm$^2$ or less, wherein the paper fibers are formed from a mixture of paper pulp and copper-containing oxidase enzyme.

23. The paper product of claim 22, comprising paper fibers and mineral oil, wherein said paper product has a MOSH migration of 0.2 mg/dm$^2$ or less and/or a MOAH migration of 0.1 mg/dm$^2$ or less.

24. A paper product comprising paper fibers and mineral oil, wherein said paper product has a MOSH migration of 0.5 mg/dm$^2$ or less for $C_{16}$ to $C_{25}$ wherein the paper fibers are formed from a mixture of paper pulp and copper-containing oxidase enzyme.

25. The paper product of claim 24, comprising paper fibers and mineral oil, wherein said paper product has a MOSH migration of 0.2 mg/dm$^2$ or less for $C_{16}$ to $C_{25}$.

26. The paper product of claim 24, comprising paper fibers and mineral oil, wherein said paper product has a MOSH migration of 0.001 to 0.15 mg/dm$^2$ for $C_{16}$ to $C_{25}$.

* * * * *